US010920882B2

(12) United States Patent
Thomassy et al.

(10) Patent No.: US 10,920,882 B2
(45) Date of Patent: Feb. 16, 2021

(54) SYSTEMS AND METHODS FOR CONTROLLING ROLLBACK IN CONTINUOUSLY VARIABLE TRANSMISSIONS

(71) Applicant: Fallbrook Intellectual Property Company LLC, Cedar Park, TX (US)

(72) Inventors: Fernand A. Thomassy, Liberty Hill, TX (US); Charles B. Lohr, Austin, TX (US); Brad P. Pohl, Leander, TX (US); David Brian Jackson, Cedar Park, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

(21) Appl. No.: 16/102,437

(22) Filed: Aug. 13, 2018

(65) Prior Publication Data

US 2018/0347693 A1    Dec. 6, 2018

Related U.S. Application Data

(63) Continuation of application No. 14/996,743, filed on Jan. 15, 2016, now Pat. No. 10,047,861.

(51) Int. Cl.
*B60W 10/108*      (2012.01)
*F16H 61/664*      (2006.01)
(Continued)

(52) U.S. Cl.
CPC .......... *F16H 61/664* (2013.01); *B60W 10/108* (2013.01); *F16H 61/66* (2013.01);
(Continued)

(58) Field of Classification Search
CPC ....... B60W 10/108; B60W 2510/1005; B60W 30/18027; Y10T 477/619; F16H 61/664; F16H 61/66
(Continued)

(56) References Cited

U.S. PATENT DOCUMENTS

| 719,595 A | 2/1903 | Huss |
| 1,121,210 A | 12/1914 | Techel |

(Continued)

FOREIGN PATENT DOCUMENTS

| CH | 118064 | 12/1926 |
| CN | 1054340 | 9/1991 |

(Continued)

OTHER PUBLICATIONS

Invitation to Pay Additional Fees dated May 3, 2017 in PCT/US2016/063880.

(Continued)

*Primary Examiner* — Roger L Pang
(74) *Attorney, Agent, or Firm* — Knobbe Martens Olson & Bear LLP

(57) ABSTRACT

A continuously variable transmission capable of operating in a forward direction or reverse direction may be controlled in the reverse direction by providing an initial skew angle in a first skew direction, followed by a set or sequence of skew angle adjustments in an opposite direction to prevent runaway or other unintended consequences. A continuously variable transmission may include a timing plate to maintain all planets at an angle or within a range of an angle in forward and reverse operations.

8 Claims, 8 Drawing Sheets

(51) Int. Cl.
  *F16H 61/66* (2006.01)
  *F16H 15/28* (2006.01)
  *B60W 30/18* (2012.01)
  *F16H 15/52* (2006.01)

(52) U.S. Cl.
  CPC ............... *B60W 30/18027* (2013.01); *B60W 2510/1005* (2013.01); *F16H 15/28* (2013.01); *F16H 15/52* (2013.01); *Y10T 477/619* (2015.01)

(58) Field of Classification Search
  USPC .................................................. 701/60, 61
  See application file for complete search history.

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,097,631 A | 11/1937 | Madle |
| 2,100,629 A | 11/1937 | Chilton |
| 2,109,845 A | 3/1938 | Madle |
| 2,112,763 A | 3/1938 | Cloudsley |
| 2,123,008 A | 7/1938 | Hayes |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,586,725 A | 2/1952 | Henry |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,028,778 A | 4/1962 | Hayward |
| 3,035,460 A | 5/1962 | Guichard |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,277,745 A | 10/1966 | Harned |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,413,896 A | 12/1968 | Wildhaber |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Azuma |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,745,844 A | 7/1973 | Schottler |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,023,442 A | 5/1977 | Woods et al. |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi et al. |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |

(56) References Cited

U.S. PATENT DOCUMENTS

| | | |
|---|---|---|
| 4,592,247 A | 6/1986 | Mutshler et al. |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,884,473 A | 12/1989 | Lew |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schievelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,577,423 A | 11/1996 | Mimura |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,085,521 A | 7/2000 | Folsom et al. |
| 6,086,506 A | 7/2000 | Petersmann et al. |
| 6,095,940 A | 8/2000 | Ai et al. |
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,125,314 A | 9/2000 | Graf et al. |
| 6,159,126 A | 12/2000 | Oshidari |
| 6,171,210 B1 | 1/2001 | Miyata et al. |
| 6,171,212 B1 | 1/2001 | Reuschel |
| 6,174,260 B1 | 1/2001 | Tsukada et al. |
| 6,186,922 B1 | 2/2001 | Bursal et al. |
| 6,188,945 B1 | 2/2001 | Graf et al. |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,356,817 B1 | 3/2002 | Abe |
| 6,358,174 B1 | 3/2002 | Folsom et al. |
| 6,358,178 B1 | 3/2002 | Wittkopp |
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,035 B2 | 8/2002 | Tsukada et al. |
| 6,440,037 B2 | 8/2002 | Takagi et al. |
| 6,459,978 B2 | 10/2002 | Tamiguchi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,558,285 B1 | 5/2003 | Sieber |
| 6,561,941 B2 | 5/2003 | Nakano et al. |
| 6,575,047 B2 | 6/2003 | Reik et al. |

(56) References Cited

U.S. PATENT DOCUMENTS

| | | |
|---|---|---|
| 6,658,338 B2 | 12/2003 | Joe et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,207,918 B2 | 4/2007 | Shimazu |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |

(56) References Cited

U.S. PATENT DOCUMENTS

| | | |
|---|---|---|
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 * | 8/2013 | Pohl .................. F16H 15/28 477/37 |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,688,337 B2 | 4/2014 | Takanami |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,814,739 B1 | 8/2014 | Hamrin et al. |
| 8,818,661 B2 | 8/2014 | Keilers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,956,262 B2 | 2/2015 | Tomomatsu et al. |
| 8,961,363 B2 | 2/2015 | Shiina et al. |
| 8,992,376 B2 | 3/2015 | Ogawa et al. |
| 8,996,263 B2 | 3/2015 | Quinn et al. |
| 9,017,207 B2 | 4/2015 | Pohl et al. |
| 9,022,889 B2 | 5/2015 | Miller |
| 9,046,158 B2 | 6/2015 | Miller et al. |
| 9,052,000 B2 | 6/2015 | Cooper |
| 9,074,674 B2 | 7/2015 | Nichols et al. |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,239,099 B2 | 1/2016 | Carter et al. |
| 9,249,880 B2 | 2/2016 | Vasiliotis et al. |
| 9,273,760 B2 | 3/2016 | Pohl et al. |
| 9,279,482 B2 | 3/2016 | Nichols et al. |
| 9,291,251 B2 | 3/2016 | Lohr et al. |
| 9,328,807 B2 | 5/2016 | Carter et al. |
| 9,341,246 B2 | 5/2016 | Miller et al. |
| 9,360,089 B2 | 6/2016 | Lohr et al. |
| 9,365,203 B2 | 6/2016 | Keilers et al. |
| 9,371,894 B2 | 6/2016 | Carter et al. |
| 9,388,896 B2 | 7/2016 | Hibino et al. |
| 9,506,562 B2 | 11/2016 | Miller et al. |
| 9,528,561 B2 | 12/2016 | Nichols et al. |
| 9,574,642 B2 | 2/2017 | Pohl et al. |
| 9,574,643 B2 | 2/2017 | Pohl |
| 9,611,921 B2 | 4/2017 | Thomassy et al. |
| 9,618,100 B2 | 4/2017 | Lohr |
| 9,656,672 B2 | 5/2017 | Schieffelin |
| 9,676,391 B2 | 6/2017 | Carter et al. |
| 9,677,650 B2 | 6/2017 | Nichols et al. |
| 9,683,638 B2 | 6/2017 | Kostrup |
| 9,683,640 B2 | 6/2017 | Lohr et al. |
| 9,709,138 B2 | 7/2017 | Miller et al. |
| 9,726,282 B2 | 8/2017 | Pohl et al. |
| 9,732,848 B2 | 8/2017 | Miller et al. |
| 9,739,375 B2 | 8/2017 | Vasiliotis et al. |
| 9,850,993 B2 | 12/2017 | Bazyn et al. |
| 9,869,388 B2 | 1/2018 | Pohl et al. |
| 9,878,717 B2 | 1/2018 | Keilers et al. |
| 9,878,719 B2 | 1/2018 | Carter et al. |
| 9,903,450 B2 | 2/2018 | Thomassy |
| 9,920,823 B2 | 3/2018 | Nichols et al. |
| 9,945,456 B2 | 4/2018 | Nichols et al. |
| 9,950,608 B2 | 4/2018 | Miller et al. |
| 10,036,453 B2 | 7/2018 | Smithson |
| 10,047,861 B2 | 8/2018 | Thomassy et al. |
| 10,056,811 B2 | 8/2018 | Pohl |
| 10,066,712 B2 | 9/2018 | Lohr et al. |
| 10,066,713 B2 | 9/2018 | Nichols et al. |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2001/0046920 A1 * | 11/2001 | Sugihara ............... F16H 61/664 476/10 |
| 2002/0019285 A1 | 2/2002 | Henzler |
| 2002/0025875 A1 | 2/2002 | Tsujioka |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0151401 A1 | 10/2002 | Lemanski |
| 2002/0161503 A1 | 10/2002 | Joe et al. |
| 2002/0169051 A1 | 11/2002 | Oshidari |
| 2002/0179348 A1 | 12/2002 | Tamai et al. |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0037886 A1 | 2/2005 | Lemansky |
| 2005/0064986 A1 | 3/2005 | Ginglas |
| 2005/0085979 A1 | 4/2005 | Carlson et al. |

(56) References Cited

U.S. PATENT DOCUMENTS

| | | |
|---|---|---|
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2005/0233846 A1 | 10/2005 | Green et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0054422 A1 | 3/2006 | Dimsey et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004554 A1 | 1/2007 | Hans |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0219048 A1 | 9/2007 | Yamaguchi |
| 2007/0228687 A1 | 10/2007 | Parker |
| 2007/0232423 A1 | 10/2007 | Katou et al. |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0055061 A1 | 2/2009 | Zhu |
| 2009/0062062 A1 | 3/2009 | Choi |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2009/0318261 A1 | 12/2009 | Tabata et al. |
| 2010/0093479 A1 | 4/2010 | Carter et al. |
| 2010/0120577 A1 | 5/2010 | Gu et al. |
| 2010/0145573 A1 | 6/2010 | Vasilescu |
| 2010/0181130 A1 | 7/2010 | Chou |
| 2011/0127096 A1 | 6/2011 | Schneidewind |
| 2011/0178684 A1 | 7/2011 | Umemoto et al. |
| 2011/0190093 A1 | 8/2011 | Bishop |
| 2011/0230297 A1 | 9/2011 | Shiina et al. |
| 2011/0237385 A1 | 9/2011 | Andre Parise |
| 2011/0291507 A1 | 12/2011 | Post |
| 2011/0319222 A1 | 12/2011 | Ogawa et al. |
| 2012/0035011 A1 | 2/2012 | Menachem et al. |
| 2012/0035015 A1 | 2/2012 | Ogawa et al. |
| 2012/0130603 A1 | 5/2012 | Simpson et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2014/0094339 A1 | 4/2014 | Ogawa et al. |
| 2014/0155220 A1 | 6/2014 | Messier et al. |
| 2014/0228163 A1 | 8/2014 | Aratsu et al. |
| 2014/0274536 A1 | 9/2014 | Versteyhe |
| 2015/0038285 A1 | 2/2015 | Aratsu et al. |
| 2015/0051801 A1 | 2/2015 | Quinn et al. |
| 2015/0219194 A1 | 8/2015 | Winter et al. |
| 2015/0345599 A1 | 12/2015 | Ogawa |
| 2015/0369348 A1 | 12/2015 | Nichols et al. |
| 2016/0003349 A1 | 1/2016 | Kimura et al. |
| 2016/0031526 A1 | 2/2016 | Watarai |
| 2016/0131231 A1 | 5/2016 | Carter et al. |
| 2016/0201772 A1 | 7/2016 | Lohr et al. |
| 2016/0290451 A1 | 10/2016 | Lohr |
| 2016/0298740 A1 | 10/2016 | Carter et al. |
| 2016/0347411 A1 | 12/2016 | Yamamoto et al. |
| 2016/0377153 A1 | 12/2016 | Ajumobi |
| 2017/0082049 A1 | 3/2017 | David et al. |
| 2017/0159812 A1 | 6/2017 | Pohl et al. |
| 2017/0204948 A1 | 7/2017 | Thomassy et al. |
| 2017/0211696 A1 * | 7/2017 | Nassouri ............ F16H 61/0213 |
| 2017/0211698 A1 | 7/2017 | Lohr |
| 2017/0268638 A1 | 9/2017 | Nichols et al. |
| 2017/0276217 A1 | 9/2017 | Nichols et al. |
| 2017/0284519 A1 | 10/2017 | Kolstrup |
| 2017/0284520 A1 | 10/2017 | Lohr et al. |
| 2017/0314655 A1 | 11/2017 | Miller et al. |
| 2017/0328470 A1 | 11/2017 | Pohl |
| 2017/0343105 A1 | 11/2017 | Vasiliotis et al. |
| 2018/0066754 A1 | 3/2018 | Miller et al. |
| 2018/0106359 A1 | 4/2018 | Bazyn et al. |
| 2018/0134750 A1 | 5/2018 | Pohl et al. |
| 2018/0148055 A1 | 5/2018 | Carter et al. |
| 2018/0148056 A1 | 5/2018 | Keilers et al. |
| 2018/0195586 A1 | 7/2018 | Thomassy et al. |
| 2018/0202527 A1 | 7/2018 | Nichols et al. |
| 2018/0236867 A1 | 8/2018 | Miller et al. |
| 2018/0306283 A1 | 10/2018 | Engesather et al. |
| 2018/0372192 A1 | 12/2018 | Lohr |
| 2019/0049004 A1 | 2/2019 | Quinn et al. |
| 2019/0195321 A1 | 6/2019 | Smithson |
| 2019/0277399 A1 * | 9/2019 | Guerin .................. F16H 61/04 |
| 2020/0018384 A1 | 1/2020 | Nichols et al. |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 2320843 Y | 5/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1791731 | 6/2006 |
| CN | 1847702 | 10/2006 |
| CN | 1860315 | 11/2006 |
| CN | 1940348 | 4/2007 |
| CN | 101016076 | 8/2007 |
| CN | 101312867 | 11/2008 |
| DE | 498 701 | 5/1930 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 19851738 | 5/2000 |
| DE | 10155372 | 5/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |

(56) References Cited

FOREIGN PATENT DOCUMENTS

| | | |
|---|---|---|
| EP | 0 976 956 | 2/2000 |
| EP | 1 136 724 | 9/2001 |
| EP | 1 251 294 | 10/2002 |
| EP | 1 366 978 | 3/2003 |
| EP | 1 433 641 | 6/2004 |
| EP | 1 624 230 | 2/2006 |
| EP | 2 620 672 | 7/2013 |
| EP | 2 893 219 | 7/2015 |
| EP | 2 927 534 | 10/2015 |
| FR | 620375 | 4/1927 |
| FR | 2460427 | 1/1981 |
| FR | 2590638 | 5/1987 |
| FR | 2996276 | 4/2014 |
| GB | 391448 | 4/1933 |
| GB | 592320 | 9/1947 |
| GB | 858710 | 1/1961 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 46-029087 B1 | 8/1971 |
| JP | 47-000448 | 1/1972 |
| JP | 47-207 | 6/1972 |
| JP | 47-20535 | 6/1972 |
| JP | 47-1621 | 8/1972 |
| JP | 47-00962 | 11/1972 |
| JP | 47-29762 | 11/1972 |
| JP | 48-54371 | 7/1973 |
| JP | 49-012742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 53-50395 U | 4/1978 |
| JP | 55-135259 | 10/1980 |
| JP | 56-24251 | 3/1981 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-125854 | 5/1988 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-225053 | 8/1998 |
| JP | 10-511621 | 11/1998 |
| JP | 11-063130 | 3/1999 |
| JP | 11-091411 | 4/1999 |
| JP | 11-210850 | 8/1999 |
| JP | 11-227669 | 8/1999 |
| JP | 11-240481 | 9/1999 |
| JP | 11-257479 | 9/1999 |
| JP | 2000-6877 | 1/2000 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-328466 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-507261 | 2/2003 |
| JP | 2003-161357 | 6/2003 |
| JP | 2003-194206 | 7/2003 |
| JP | 2003-194207 | 7/2003 |
| JP | 2003-320987 | 11/2003 |
| JP | 2003-336732 | 11/2003 |
| JP | 2004-011834 | 1/2004 |
| JP | 2004-38722 | 2/2004 |
| JP | 2004-162652 | 6/2004 |
| JP | 2004-189222 | 7/2004 |
| JP | 2004-232776 | 8/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2008-002687 | 1/2008 |
| JP | 2008-14412 | 1/2008 |
| JP | 2008-133896 | 6/2008 |
| JP | 2010-069005 | 4/2010 |
| JP | 2012-107725 | 6/2012 |
| JP | 2012-122568 | 6/2012 |
| JP | 2012-211610 | 11/2012 |
| JP | 2012-225390 | 11/2012 |
| JP | 2015-227690 | 12/2015 |
| JP | 2015-227691 | 12/2015 |

(56) References Cited

FOREIGN PATENT DOCUMENTS

| | | |
|---|---|---|
| KR | 2002 0054126 | 7/2002 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200821218 | 5/2008 |
| WO | WO 99/08024 | 2/1999 |
| WO | WO 99/20918 | 4/1999 |
| WO | WO 01/73319 | 10/2001 |
| WO | WO 03/100294 | 12/2003 |
| WO | WO 05/083305 | 9/2005 |
| WO | WO 05/108825 | 11/2005 |
| WO | WO 05/111472 | 11/2005 |
| WO | WO 06/091503 | 8/2006 |
| WO | WO 08/078047 | 7/2008 |
| WO | WO 10/073036 | 7/2010 |
| WO | WO 10/135407 | 11/2010 |
| WO | WO 11/064572 | 6/2011 |
| WO | WO 11/101991 | 8/2011 |
| WO | WO 11/121743 | 10/2011 |
| WO | WO 12/030213 | 3/2012 |
| WO | WO 13/042226 | 3/2013 |
| WO | WO 14/186732 | 11/2014 |
| WO | WO 16/062461 | 4/2016 |

OTHER PUBLICATIONS

International Search Report and Written Opinion dated Jun. 27, 2017 in PCT/US2016/063880.
Office Action dated Nov. 3, 2017 in U.S. Appl. No. 14/996,743.
Notification of the First Office Action dated Jun. 26, 2019 in Chinese Patent Application No. 201680080281.3.
Notification of the Second Office Action dated Mar. 16, 2020 in Chinese Patent Application No. 201680080281.3.

\* cited by examiner

VIEW A-A

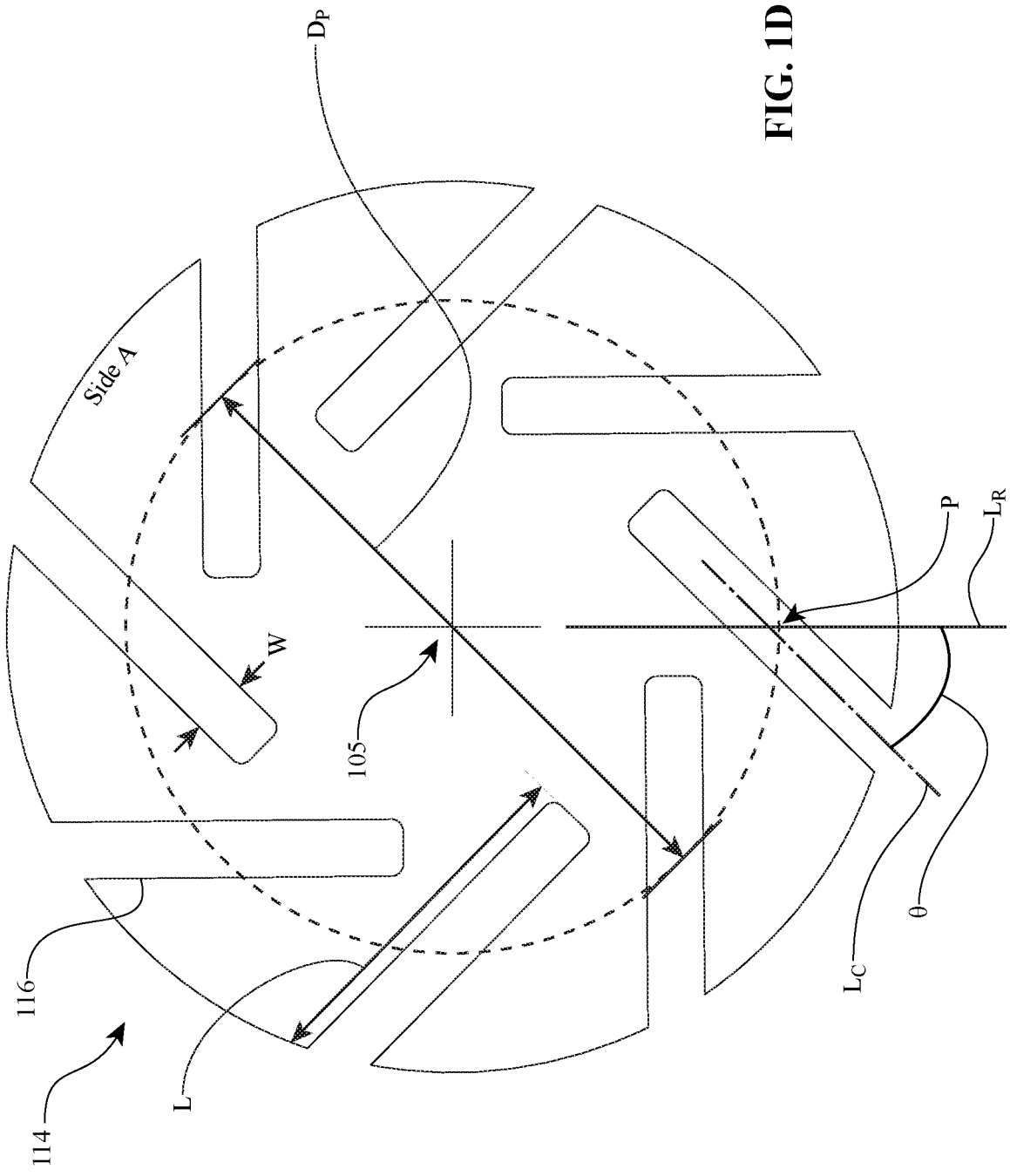

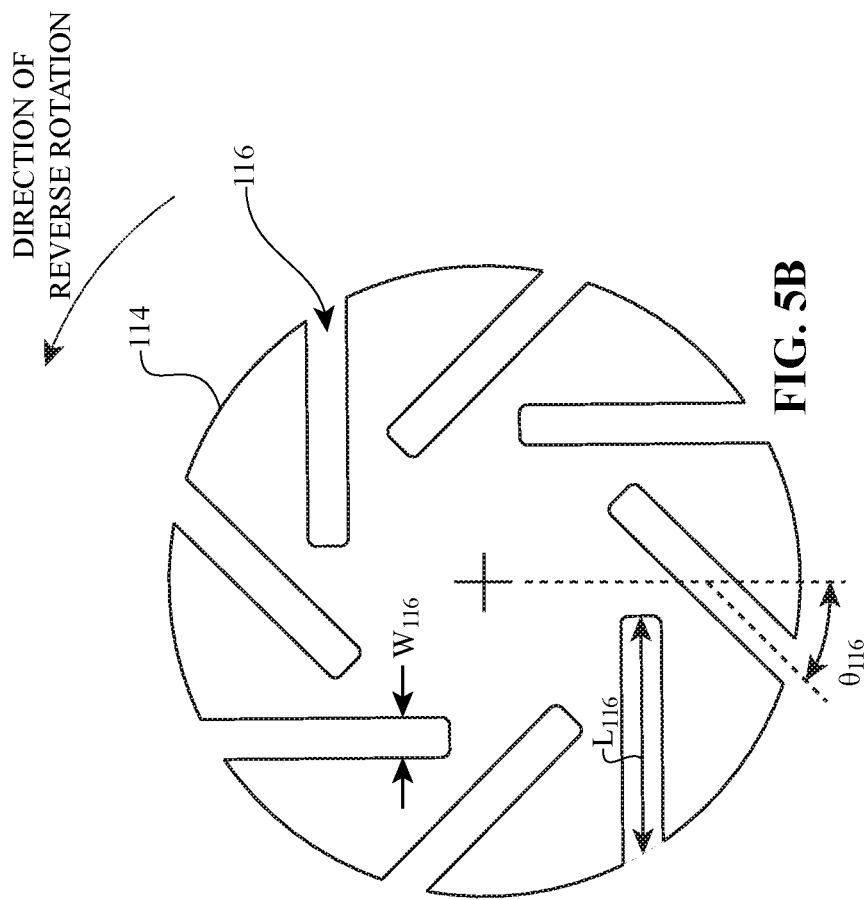
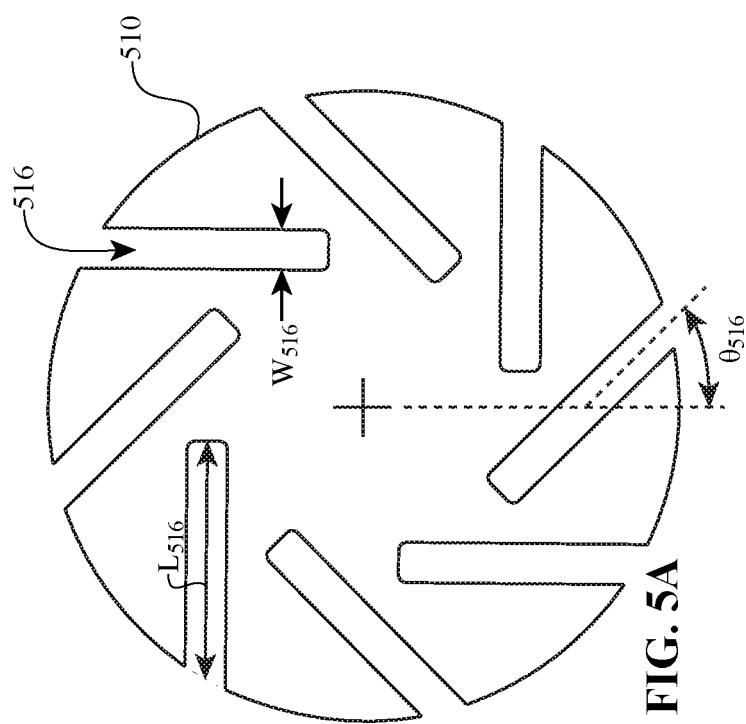
FIG. 5B
FIG. 5A

SYSTEMS AND METHODS FOR CONTROLLING ROLLBACK IN CONTINUOUSLY VARIABLE TRANSMISSIONS

CROSS-REFERENCE TO RELATED APPLICATIONS

This application is a continuation of U.S. patent application Ser. No. 14/996,743, filed Jan. 15, 2016 and scheduled to issue as U.S. Pat. No. 10,047,861 on Aug. 14, 2018. The disclosures of the all of the above-referenced prior applications, publications, and patents are considered part of the disclosure of this application, and are incorporated by reference herein in their entirety. This application is related to U.S. Pat. Nos. 8,313,404, 8,469,856, and 8,888,643, all of which are incorporated by reference herein.

FIELD OF THE DISCLOSURE

Embodiments disclosed herein may be directed to continuously variable transmissions. In particular, embodiments may be directed to ball-planetary type continuously variable transmissions intended for forward rotation.

BACKGROUND

The term "continuously variable planetary transmission" (or "CVP") may refer to a variable ratio planetary drive assembly capable of transmitting continuous and stepless power (speed and torque). A CVP may be a continuously variable subassembly (or "variator") of a continuously variable transmission or, where there are no additional elements that modify speed and torque, the CVP may be referred to as a continuously variable transmission ("CVT"). Ball-planetary continuously variable transmissions (CVTs) generally utilize a plurality of spherical rolling elements (also commonly referred to as balls, planets, or spheres) interposed between an input ring and an output ring, and in contact with a sun. A CVP capable of operating in either a forward direction or a reverse direction may be referred to as an infinitely variable transmission ("IVT").

SUMMARY

Embodiments disclosed herein may overcome the shortcomings of the prior art with systems and methods for controlling rollback in a continuously variable transmission.

In one broad respect, embodiments may be directed to a system or method for controlling rollback in a continuously variable transmission. When operating in a forward (design) direction, feedback is generally provided by the geometry of carrier slots. During reversed operation (rotation opposite to design), feedback is provided by skew actuator commands generated by algorithms in a control module. The control module may be integrated with an actuator or comprise a set of instructions stored in memory on a controller communicatively coupled to an actuator.

In another broad respect, embodiments may be directed to a system or method for controlling rollback in a continuously variable transmission operating in a reverse direction. In some embodiments, at the onset of reverse operation, a set of commands causes an actuator to change skew angle $\zeta$ (zeta) of a plurality of planet axles in a direction that will result in a change in tilt angle $\gamma$ (gamma) towards reduction during rotation opposite to design. The number and timing of the set of commands overcomes inaccuracies in skew angle $\zeta$ (zeta) due to machining error or overcomes droop in skew angle $\zeta$ (zeta) due to load. The set of commands may include a first command to cause at least one planet carrier to rotate in a first direction. In some embodiments, the set of commands may include a second command to hold at least one planet carrier at a fixed skew angle. In some embodiments, the set of commands may include one or more commands executed after a first or second command as needed to rotate at least one planet carrier in a second rotation direction opposite the first rotation direction. The method may be performed by executing a set of instructions stored in a memory integral to the actuator or comprise a set of instructions stored in memory on a controller communicatively coupled to the actuator.

In another broad respect, embodiments may be directed to a system or method for controlling rollback in a continuously variable transmission capable of operating in a forward or reverse direction. At the expectation of reverse operation, a set of commands causes an actuator to offset skew angle $\zeta$ (zeta) for a plurality of planet axles in a direction to result in a change in the tilt angle $\gamma$ (gamma) towards reduction for reverse operation. The set of commands, including the initial skew angle and any subset angles, is determined based on one or more of a geometry of the CVT, a desired operating speed or torque of the CVT and a determined input torque or speed of the CVT. The set of commands overcomes inaccuracies in skew angle $\zeta$ (zeta) due to machining error and overcomes droop in skew angle $\zeta$ (zeta) due to load. The method may be performed by executing a set of instructions stored in a memory integral to the actuator or comprise a set of instructions stored in memory on a controller communicatively coupled to the actuator.

In another broad respect, embodiments may be directed to a system or method for managing rollback in a continuously variable transmission. Whenever the transmission is stopped, and the next action is indeterminate, a command is sent to an actuator for offsetting skew angle $\zeta$ (zeta) for a plurality of planet axles in a direction that will result in a change in the tilt angle $\gamma$ (gamma) towards reduction if rotation direction is reverse. The command is sufficient to overcome inaccuracies in skew angle $\zeta$ (zeta) due to machining error and overcomes droop in skew angle $\zeta$ (zeta) due to load. The method may be performed by executing a set of instructions stored in a memory integral to the actuator or comprise a set of instructions stored in memory on a controller communicatively coupled to the actuator.

In another broad respect, embodiments may be directed to a system or method for controlling rollback in a continuously variable transmission. During rotation opposite to design, skew angle $\zeta$ (zeta) may be continuously monitored as the change in tilt angle $\gamma$ (gamma) for the drive approaches reduction. If skew angle $\zeta$ (zeta) is determined to be increasing due to positive feedback (e.g., angled guide slots increasing skew angle $\zeta$ (zeta)), rotation of at least one carrier in an opposite direction may be used to counteract the positive feedback. In some embodiments, if during rotation opposite to design the skew angle $\zeta$ (zeta) is offset in a direction that causes a change in the tilt angle $\gamma$ (gamma) towards reduction, then as the tilt angle $\gamma$ (gamma) changes towards reduction, the angled guide slots will cause an increase in the skew angle $\zeta$ (zeta). In some embodiments, to prevent runaway adjustments, a subsequent change in the skew angle $\zeta$ (zeta) back towards zero skew angle follows the ratio change. A method may be performed by executing a set of instructions stored in a memory integral to an actuator or comprise a set of instructions stored in memory on a controller communicatively coupled to an actuator.

In another broad respect, embodiments may be directed to a method for managing the skew angle in a continuously variable transmission. A targeted continuous operating condition for rotation opposite design comprises a rotation position where the planet axle ends nearest an input end of the CVP contact the centermost limit of the input carrier's guide slot. In some embodiments, a continuous skew angle $\zeta$ (zeta) may be limited to the minimum skew angle $\zeta$ (zeta) required to maintain a reduction rotation effort for each of the planets in an array of planets. In some embodiments, the continuous skew angle $\zeta$ (zeta) may be limited with consideration to machining errors or an unexpected change in external load and ratio droop.

In another broad respect, embodiments may be directed to a system for controlling skew angle in a continuously variable transmission. A slotted timing plate may be used to limit the error in ratio angle any single planet may have in relation to the mean ratio of the remaining planets. The timing plate may be a free turning disc with radial guide slots placed axially between the carrier halves. Each of the planet axles extends through the timing plate and engages the carrier guide slots at one end of the drive. Tolerances of timing plate slots allow the carrier guide slots to be the primary circumferential alignment feature for the planets. The angle or tolerances of slots in a timing plate may be based on slots formed in at least one carrier.

In another broad respect, embodiments may be directed to a system for controlling skew angle in a continuously variable transmission. A slotted timing plate having slots with tolerances and oriented at an angle other than perpendicular to an axis of rotation may be used to limit the error in ratio angle any single planet may have in relation to the mean ratio of the remaining planets. The timing plate may be a free turning disc with radial guide slots, and may be positioned axially outside of the carrier halves. Each of the planet axles extends through the carrier guide slots and engages the timing plate at one end of the drive (i.e., at an input or an output of the CVT). Tolerances of timing plate slots allow the carrier guide slots to be the primary circumferential alignment feature for the planets.

In another broad respect, embodiments disclosed herein may be directed to a variator having a sun, a plurality of planets, and first and second rings. The plurality of planets may be interposed between the first and second rings, and further in contact with and rotatable about the sun. An offset radial slot timing plate may enhance the control by ensuring each planet in the plurality of planets is within a controlled ratio angle of the whole and within a limited skew angle $\zeta$ (zeta) of the whole. The timing plate may be a free turning disc with offset radial guide slots placed axially between the array of planets and one of the carriers. Each of the planet axles extends through a timing plate slot and engages a carrier guide slot. The timing plate slots have tolerances large enough to allow the carrier guide slots to be the primary circumferential alignment feature for the planets. The angle between the timing plate slots and the carrier guide slots is non zero.

In another broad respect, embodiments disclosed herein may be directed to a variator having a sun, a plurality of planets, and first and second rings. The plurality of planets may be interposed between the first and second rings, and further in contact with and rotatable about the sun. An offset radial slot timing plate may enhance the control by ensuring each planet in the plurality of planets is within a controlled ratio angle of the whole and within a limited skew angle $\zeta$ (zeta) of the whole. The timing plate may be a free turning disc with offset radial guide slots placed axially outside the array of planets and axially outside one of the carriers. Each of the planet axles extends through a carrier guide slot and engages a timing plate slot. The carrier guide slots have tolerances large enough to allow the timing plate slots to be the primary circumferential alignment feature for the planets. The angle between the timing plate slots and the carrier guide slots is non zero.

In another broad respect, embodiments disclosed herein may be directed to a variator having a sun, a plurality of planets, first and second rings, first and second carriers, and a timing plate used to limit errors in ratio that any single spherical planet may have in relation to the mean ratio of the plurality of planets. The timing plate may be grounded relative to the carrier located opposite the plurality of planets. The timing plate may be grounded due to a direct coupling between the timing plate and the carrier or may be grounded to an element that is also grounded relative to the carrier.

In another broad respect, embodiments disclosed herein may be directed to a variator having a sun, a plurality of planets, first and second rings, first and second carriers, and a timing plate used to limit the error in ratio that any single planet may have in relation to the mean ratio of the remaining planets. The timing plate may be counter-timed to the carrier located on the same side of the plurality of planets. In other words, if the timing plate is located near an input carrier on a first side of the plurality of planets, the timing plate may be counter-timed relative to the input carrier. Counter-timing the timing plate with the first carrier may be accomplished by a gear mechanism.

These, and other, aspects will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

FIGS. 1A, 1B, 1C, and 1D depict simplified views of a CVT, illustrating one embodiment of a control mechanism for a ball-planetary type infinitely variable transmission;

FIG. 5A depicts a partial view of one embodiment of a system utilizing a timing plate for controlling a continuously variable transmission during reverse operation;

FIG. 5B depicts an exploded view of one embodiment of a system utilizing a timing plate for use in controlling a continuously variable transmission during reverse operation.

DETAILED DESCRIPTION

Figure 1A:
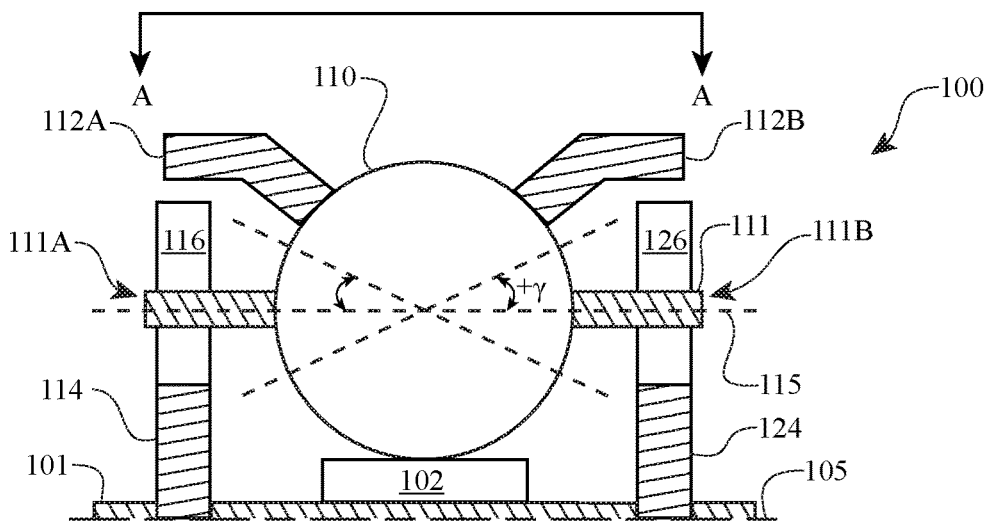

Various features and advantageous details are explained more fully with reference to the non-limiting embodiments that are illustrated in the accompanying drawings and detailed in the following description. Descriptions of well-known starting materials, processing techniques, components and equipment are omitted so as not to unnecessarily obscure the features and advantages they provide. It should be understood, however, that the detailed description and the specific examples, while indicating preferred embodiments, are given by way of illustration only and not by way of limitation. Various substitutions, modifications, additions and/or rearrangements within the spirit and/or scope of the underlying concepts will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, the use of the term "or" refers to an inclusive "or" and not to an exclusive (or logical) "or." For example, a condition "A or B" is satisfied by any one of the following: A is true (or present) and B is false (or not present), A is false (or not present) and B is true (or present), or both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Embodiments of the invention disclosed here are related to the control of a variator and/or a CVT using generally spherical planets each having a tiltable axis of rotation that can be adjusted to achieve a desired ratio of input speed to output speed during operation. In some embodiments, adjustment of said axis of rotation involves angular displacement of the planet axis in a first plane in order to achieve an angular adjustment of the planet axis in a second plane, wherein the second plane is substantially perpendicular to the first plane. The angular displacement in the first plane is referred to here as "skew," "skew angle," and/or "skew condition." For discussion purposes, the first plane is generally parallel to a longitudinal axis of the variator and/or the CVT. The second plane can be generally perpendicular to the longitudinal axis. In one embodiment, a control system coordinates the use of a skew angle to generate forces between certain contacting components in the variator that will tilt the planet axis of rotation substantially in the second plane. The tilting of the planet axis of rotation adjusts the speed ratio of the variator. The aforementioned skew angle, or skew condition, can be applied in a plane substantially perpendicular to the plane of the page of FIG. 1, for example. Embodiments of transmissions employing certain inventive skew control systems for attaining a desired speed ratio of a variator will be discussed.

The following description may be easier to understand in a specific context, particularly when considering a variator configured such that power is input via a first ring and exits via a second ring, with power not passing through a sun. In the context of the configuration illustrated in FIGS. 1A, 1B, and 1C, planet carrier 114 or 124 may be non-rotating with respect to a main axle such as main axle 101, the input is via a first ring 112A and the output is via a second ring 112B (also referred to as a "ring to ring" configuration). The actions and effects are the same for any configuration, such as input to a pair of carriers or to the sun, as long as the description is normalized to relative rotation of the rings to the carrier.

Figure 1B:
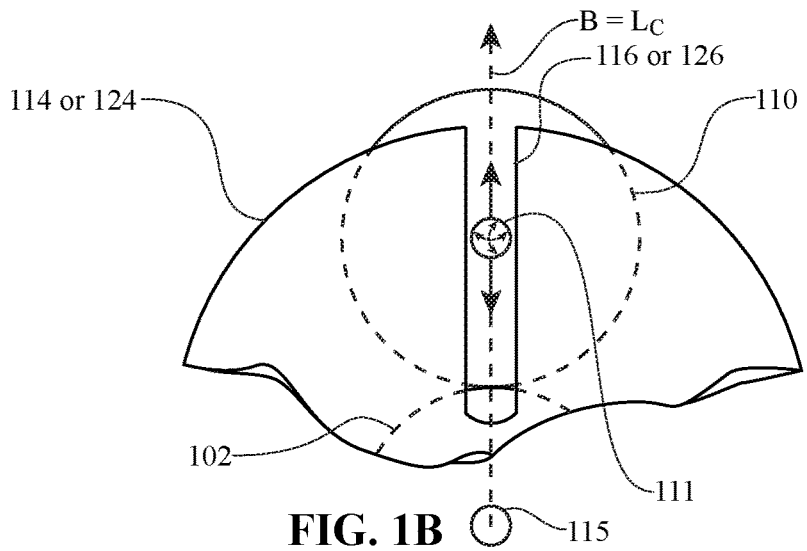
Figure 1C:
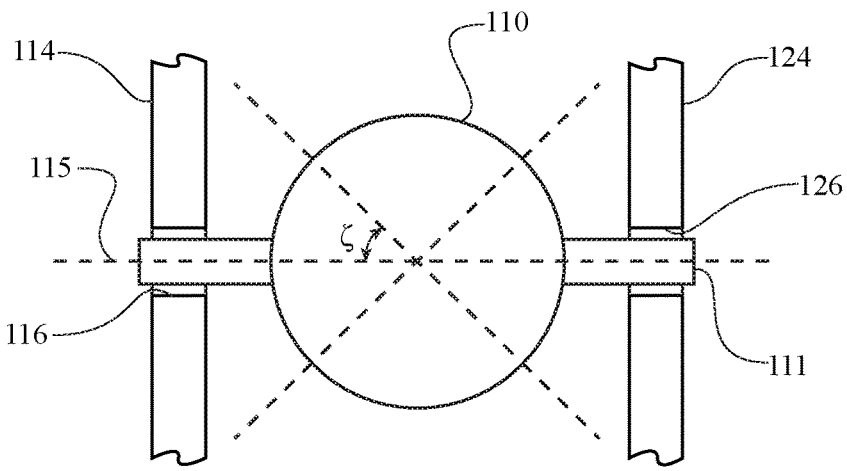

FIGS. 1A, 1B and 1C depict simplified views of an exemplary CVP comprising a plurality of planets for continuously transferring power. In particular, FIG. 1A depicts CVP 100 having a plurality of planets 110 distributed about main axle 101 defining longitudinal axis 105. Main axle 101 is a rigid member for supporting other elements and for transmitting power from a power source to the elements or from the elements to a power load. Main axle 101 may be solid or may have at least a portion with a hollow passage for allowing fluid flow or to accommodate sensors, wires, control mechanisms, rods, shafts, other axles, conduits, reservoirs, etc. Longitudinal axis 105 is an axis of rotation for planets 110, traction rings 112, sun 102 and planet carriers 114 and 124, and may also be referred to as a main axis or a center axis.

In addition to elements rotating about main axis 105, each planet 110 has a tiltable planet axle 111. Each planet axle 111 extends through a planet 110 and defines axis of rotation 115 for that planet 110. Similar to main axle 101, planet axles 111 are rigid members. Planet axles may also be solid or hollow for enabling fluid flow through planets 110.

Power may be input to planets 110 via ring 112A or 112B or to sun 102 via main axle 101, and transferred via planets 110 to sun 102 or ring 112A or 112B as needed. As described above, planets 110 are rotatable about tiltable planet axles 111. Control of how power is transferred across planets 110 is based on a tilt angle γ (gamma). Tilt angle γ (gamma) is used herein to refer to a projection of an angle between planet axis of rotation 115 and longitudinal axis 105 in the plane containing both axes, and may also be referred to as "ratio angle."

Embodiments disclosed herein may take advantage of the architecture of CVTs that allows skew shifting (i.e., imparting a skew angle to cause a stepless change in tilt angle γ). FIGS. 1B-1D depict side and top views of one embodiment of a CVT, illustrating slot angles and angular displacement and their effects on skew angle. As depicted in FIGS. 1A, 1B, 1C, and 1D, carrier 114 has slots 116 configured to retain ends 111A of planet axles 111 such that ends 111A of planet axles 111 may move along slots 116 (independently of axle ends 111B retained in slots 126 of carrier 124), enabling a change in skew angle ζ (zeta), causing a change in tilt angle γ (gamma) to provide continuous and stepless adjustment of the speed ratio of variator 100. As depicted in FIG. 1B, slots 116 (or 126) may be oriented at a bias angle B of zero degrees, where bias angle B is relative to a construction line $L_C$ of carrier 114 (or 124) extending radially outward perpendicular to axis of rotation 115 (extending out of the page).

As depicted in FIGS. 1A, 1B and 1C, carrier 124 has slots 126 configured to retain ends 111B of planet axles 111 such that ends 111B of planet axles 111 may move along slots 126 (independent of axle ends 112A), enabling a change in skew angle ζ to cause a change in tilt angle γ (gamma) to provide a continuous (stepless) change in the speed ratio of variator 100.

In some embodiments, carrier 114 is rotatable relative to carrier 124. In other embodiments, carrier 124 is rotatable relative to carrier 114. The angle of relative rotation between carriers 114 and 124 may be adjusted based on a desired skew angle ζ (zeta), a target tilt angle γ (gamma), or a desired speed ratio (SR). In other words, if slots 116 in carrier 114 have a different angle or orientation relative to slots 126 in carrier 124, then when carriers 114 and 124 rotate relative to each other, the ends 111A, 111B of planet axles 111 may translate or rotate within slots 116 or 126, causing a skew angle (ζ) to be applied to planets 110 to cause a change in tilt angle γ (gamma), causing a change in speed ratio (SR). Ends 111A, 111B of planet axles 111 may be configured to allow for linear motion as well as rotational motion of planet axles 111.

When planet axles 111 are oriented such that axes of rotation 115 are parallel with center axis 105 (i.e., tilt angle γ (gamma)=0), the rotational speed and torque transmitted across planets 110 to ring 112B is substantially equivalent to the rotational speed and torque applied to ring 112A (minus losses due to friction, tolerances and the like). When power is transmitted from ring to ring (e.g., from ring 112A to ring 112B or from ring 112B to ring 112A) and planet axles 111 are tilted at a non-zero tilt angle (i.e., tilt angle γ (gamma) is greater than or less than 0), the CVP is considered to be operating in either underdrive or overdrive, and the rotational speed and torque are at some other ratio. The term "underdrive" is used herein to refer to a transmission ratio that causes an increase of torque from the input to the output of a transmission. Underdrive may also refer to a decrease in rotational speed from the input to the output of a transmission, and may also be referred to as "reduction." When planet axles 111 are at a positive tilt angle γ (gamma) greater than 0 such that axes of rotation 115 are not parallel with center axis 105, ring 112B experiences an increase in torque and a decrease in rotational speed. The term "overdrive" is used herein to refer to a transmission ratio that causes a decrease of torque from the input to the output of a transmission. Overdrive may also refer to an increase in rotational speed from the input to the output of a transmission, and may also be referred to as "speed up." When planet axles 111 are at a negative tilt angle γ (gamma) greater than 0, CVP 100 is considered to be in overdrive and ring 112B experiences a decrease in torque and an increase in rotational speed. The principles apply whether the power path is from a ring to ring, ring to sun, or sun to ring in that the relationship between the skew forces and the skew direction are constant.

The value of the tilt angle γ (gamma) (including positive or negative) may be controlled through the use of carriers 114, 124. Carriers 114, 124 are structures that control the relative rotation angle Ψ (psi) between ends 111A, 111B of planet axles 111. Carriers 114, 124 control the absolute rotational angle between the planet positions and an inertial reference frame. A change in the relative rotational angle between first and second carriers 114, 124 may be referred to as Ψ (psi) or "carrier shift." It should be noted that carrier rotation refers to something other than, for example, "ratio shift" or "gamma shift." Furthermore, the term "rotation angle" is used herein to refer to a relative rotational angle between carriers 114 and 124. For ease of understanding, throughout this document carrier 114 is referred to as being placed at the input of the variator, and carrier 124 is referred to as located at the output of the variator. Carriers 114 and 124 have slots 116, 126 configured to retain ends 111A, 111B of planet axles 111 such that ends 111A, 111B may translate along slots 116, 126 and may further rotate or experience other motion.

Slots 116, 126 each have a length L, a width W, and a slot angle Θ (theta). The lengths of slots 116, 126 extend inside a pitch diameter ($D_P$) of carrier 114, 124. The widths of slots 116, 126 allow ends 111A or 111B of planet axles 111 to translate or rotate. However, if the width of any slot 116, 126 is outside a tolerance for all slots 116, it is possible for one planet 110 to behave different than other planets 110 and control of a CVP becomes more difficult. One effect of a CVP being more difficult to control is a decreased efficiency of the CVP. Slot angle Θ (theta) is defined at the projected intersection (P) of the centerline of the skew guide feature (i.e., slot 116 or 126), a radial line $L_R$ normal to center axis 105 and pitch diameter $D_P$ of the array of traction planets 110, wherein the projection plane is normal to center axis 105. Slot angle Θ may also be referred to as an offset radial angle, a skew slot angle, or a guide slot angle. The term "radial" generally describes a line, groove or slot normal to center axis 105. A second description of an offset radial feature is a feature tangent to a circle of non-zero radius concentric to the center axis.

Ratio rotation may be controlled by applying a skew angle ζ (zeta) to planet axles 111. Skew refers to an angle from a plane containing planet axis 115 to a plane containing center axis 105. A skew angle ζ (zeta) may refer to an included angle between the projection of a skew guide feature and a radial line $L_R$ normal to center axis 105, wherein the projection plane is normal to center axis 105.

During normal direction operation of CVT 100, the geometry of carriers 114, 124 adds negative feedback when tilt angle γ (gamma) changes, which contributes to system stability during ratio change. One such negative feedback geometry involves carriers 114 with at least one set of carrier guide slots 116 or 126 that are not purely radial but instead are angled with respect to a radial plane. The angle β (beta) of slots 116 may be singular (i.e., constant) or may be different at each radial increment. Slots 116 or 126 may be straight or curved. Advantageously, angled slots 116 or 126 utilize a positive change of ratio angle to cancel a positive skew angle ζ. When a CVT is rotating in the normal direction (also referred to as the design or rolling direction), any bias of the CVT is countered, the CVT remains at the desired skew angle ζ (zeta) until a tilt angle γ (gamma) is achieved, and the CVT is stable. Thus, only an initial skew angle input is necessary to achieve a target tilt angle output.

An undesirable effect can occur when a ball type variator operates in a reverse direction. Namely, if a CVT is configured to induce a tilt angle by applying a skew angle ζ (zeta) in the rolling direction and relies on negative feedback to reduce skew angle ζ (zeta) as the tilt angle γ (gamma) changes, then if the direction of operation is reversed and the negative feedback becomes positive feedback (i.e., the feedback becomes positive such that a skew angle ζ (zeta) inducing a tilt angle change is positively reinforced as the tilt angle γ (gamma) changes) the CVT may become unstable, and might continue to change tilt angle γ (gamma) to an extreme underdrive or overdrive condition.

Figure 2A:
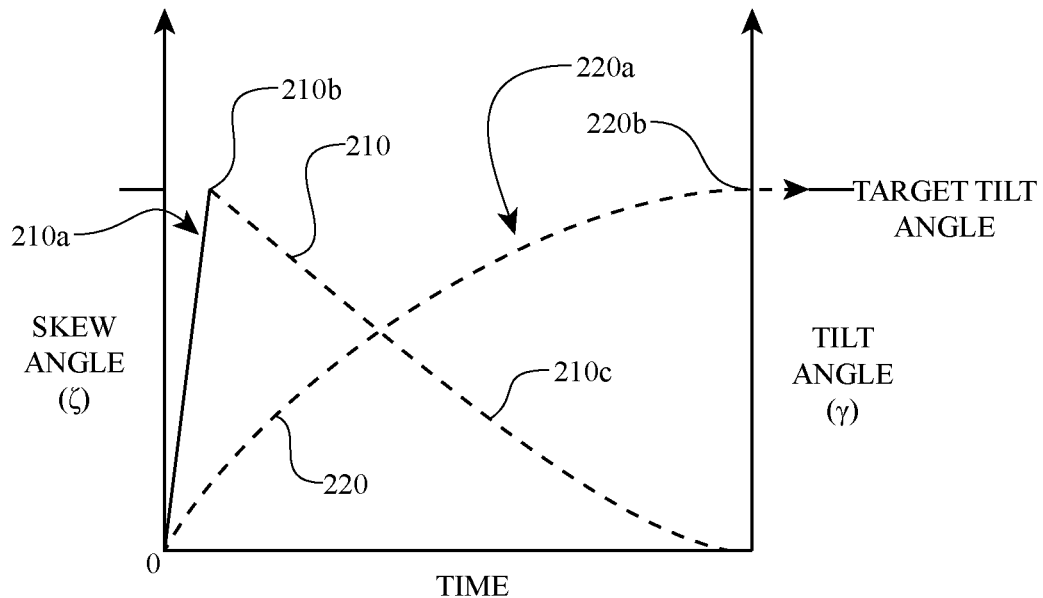
FIG. 2A depicts a graph of tilt angle and skew angle over time, illustrating operation of one embodiment of a continuously variable transmission in a design direction.
Figure 2B:
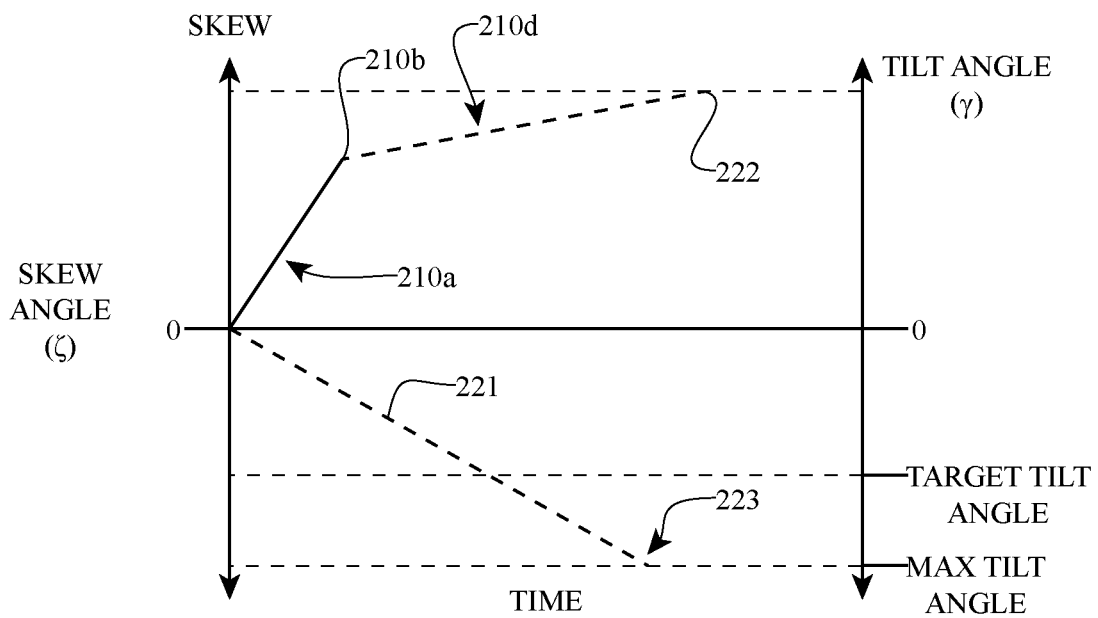
FIG. 2B depicts a graph of tilt angle and skew angle over time, illustrating operation of one embodiment of a continuously variable transmission in a reverse direction.

FIGS. 2A and 2B depict diagrams illustrating operation of a CVT according to one embodiment. As a general note, solid lines represent active control or input into the system, and dashed lines represent effects. Thus, a change in an actuator position (e.g., an external command) intended for causing a desired rotation of a carrier 114 or 124 will be represented by a solid line, whereas if the same carrier 114 or 124 is rotated due to the geometry of the CVT, that movement is represented by a dashed line.

FIG. 2A depicts a diagram, illustrating changes in tilt angle γ (gamma) 220 and skew angle 210 over time for planet axles 111 (and therefore planet axes of rotation 115) in a CVT, illustrating a relationship between skew angle and tilt angle γ (gamma) for a CVT operating in a design operation. As depicted in FIG. 2A, skew angle 210 is controlled by a CVT during a first time period 210a until the skew angle reaches a desired skew angle 210b. In response, tilt angle 220 "follows" the skew angle over time 220a to a target tilt angle 220b, and skew angle 210 returns to zero over time 210c. In other words, during operation in the design direction, a first rotation of carrier 114 or 124 relative to carrier 124 or 114 to target skew angle 210b induces planet axle ends 111A to move in a first direction and the geometry of slots 116 and 126 translate axle ends 111A to generate a skew condition in the variator. The geometry of slots 116 and 126 allows ends 111A to translate in slots 116 to target tilt angle 220b. Eventually, the original rotation of carrier 114 or 124 and the angular movement of axle ends 111A due to slots 116 and 126 will offset and planet axles 111 will have zero skew angle at the target tilt angle. When the actual skew angle and the desired skew angle are equal and planet axes of rotation 115 are parallel to axis of rotation 105, the planet axle angle will stop changing (i.e. the system is stable). FIG. 2A depicts this principle.

FIG. 2B depicts a diagram of skew angle and tilt angle γ (gamma) over time, illustrating a relationship between skew angle and tilt angle during reverse operation. During reverse rotation, if a first carrier (e.g., carrier 114) is rotated to achieve a skew angle (depicted as point 210b), a skew condition of the planet axes of rotation 115 will cause planet axle ends 111A to rotate in a first direction, but slots 116 may allow planet axle ends 111A to move further radially inward, indicated by line 221. Because slots 116 are configured with slot angle Θ (theta) for rotation in a design direction, as planet axle ends 111A move radially inward, slots 116 will cause planet axle ends 111A to move in a second direction. This motion caused by slots 116 will add to the original rotation of first carrier 114, indicated by line 210d. The skew angle 210d of planet axes of rotation 115 will increase and the impetus for planet axle ends 111A in first carrier 114 to move radially inward will increase. FIG. 2B depicts a diagram illustrating this principle. Eventually, the skew angle ζ (zeta) of planet axes of rotation 115 from the rolling direction will increase to a maximum value 222 to cause the tilt angle to reach a maximum value 223 such that the transmission torque loss will overcome the available drive torque (i.e., the system is unstable). Moreover, if the scenario is left unchecked, sliding action caused by a planet whose axis of rotation is radically skewed from the rolling direction may destroy the rolling contacts or otherwise cause damage to the CVT, which may cause the CVT to fail.

Alternatively, during reverse rotation, if first carrier 114 is rotated in the opposite direction, skew angle 210 of planet axes of rotation 115 will cause planet axle ends 111A in first carrier slots 116 to move radially outward. Because slot angle Θ (theta) of slots 116 is configured for rotation in a design direction, as planet axle ends 111A moves radially outward, slots 116 will cause planet axle ends 111A to move. This motion caused by slots 116 will add to the original rotation of first carrier 114 (i.e., bias first carrier 114 in the same direction). The skew angle 210d of planet axes of rotation 115 will increase and the impetus for planet axle ends 111A at first carrier 114 to move radially outward will increase. Eventually, the skew angle ζ (zeta) of planet axes of rotation 115 will reach a value 222 to cause the tilt angle γ (gamma) to reach a value 223 such that the transmission torque loss will overcome the available drive torque. Moreover, any sliding action, caused by any planet 110 whose axis of rotation 115 is radically skewed from the rolling direction, may contact, damage or destroy a rolling contact or other component of the CVP.

Figure 3A:
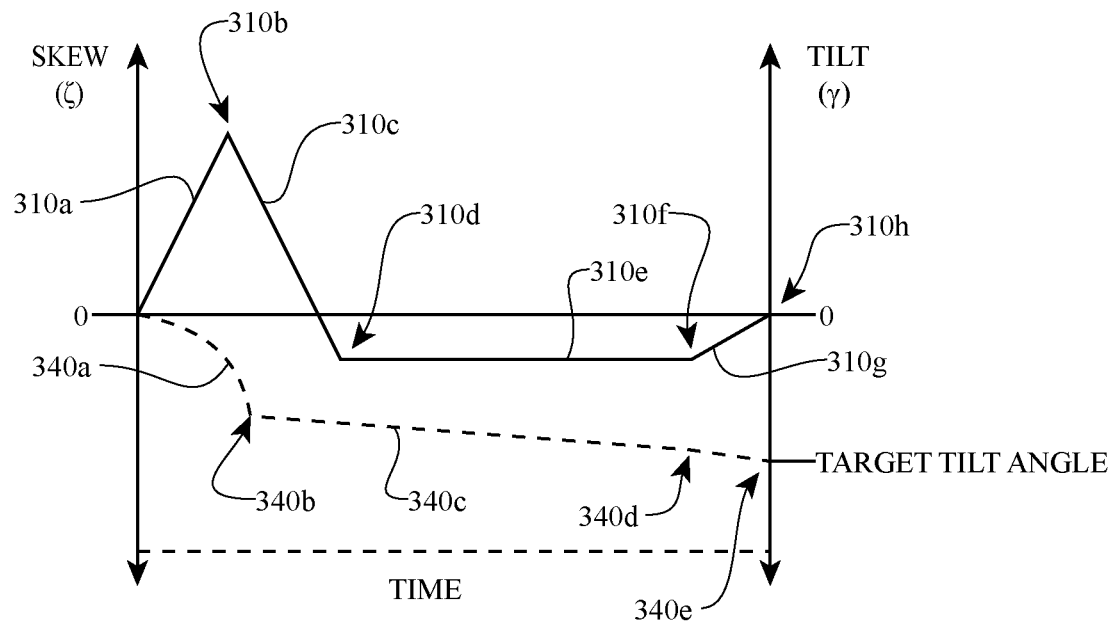
FIG. 3A depicts a graph of tilt angle and skew angle over time, illustrating one method of managing rollback in a continuously variable transmission according to one embodiment.
Figure 3B:
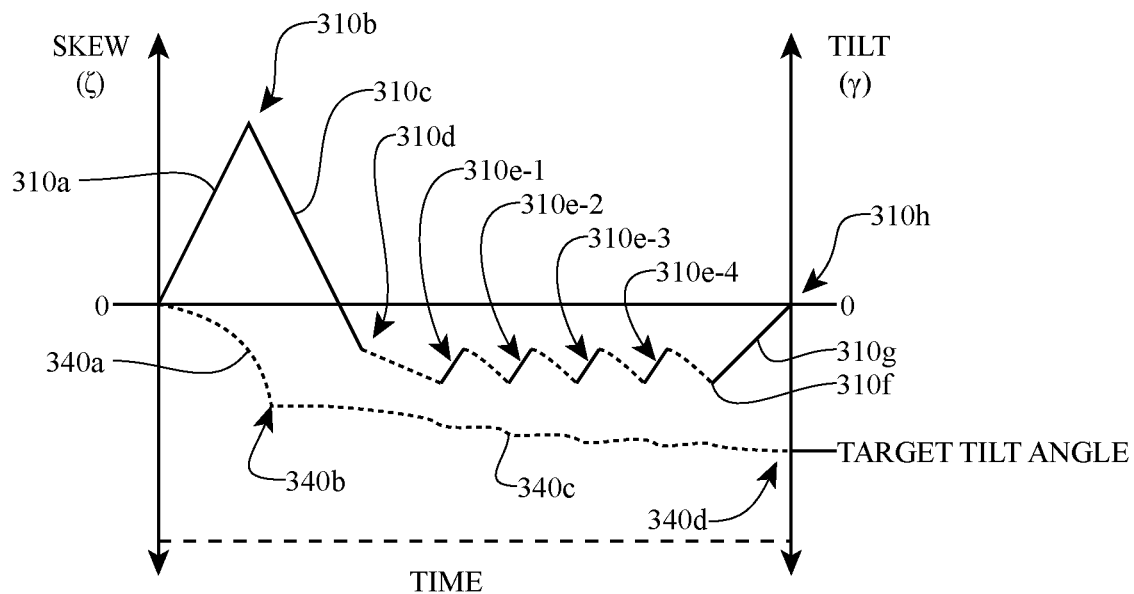
FIG. 3B depicts a graph of tilt angle and skew angle over time, illustrating one method of managing rollback in a continuously variable transmission according to one embodiment.

Embodiments disclosed herein may overcome these, and other limitations of the prior art. Embodiments allow reverse rotation in a ball type variator utilizing skew control and angled slots in carriers 114, 124. Skew control and angled slots 116, 126 in carriers 114 and 124 provide negative feedback to planet axis angle change when in forward rotation. When operating in a reverse rotation, the rotation angle of first carrier 114 relative to second carrier 124 is actively controlled such that the skew angle of planet axes of rotation 115 relative to the rolling direction is controlled. For example, consider that during reverse rotation, tilt angle γ (gamma) of planet axes of rotation 115 is to be adjusted such that axle ends 111A at first carrier 114A move radially inward by a small amount. FIGS. 3A and 3B depict diagrams of skew angle and tilt angle over time, illustrating how tilt angle γ (gamma) may be changed even when a CVT is operating in a reverse direction.

Embodiments for controlling a tilt angle during reverse rotation disclosed herein may include a processor communicatively coupled to an actuator and a memory storing a program or a set of instructions executable by the processor. The processor may perform a method of controlling or managing a CVP, a variator, a CVT subassembly, a CVT, a drivetrain or a vehicle having a CVT.

FIG. 3A depicts a flow diagram, illustrating one embodiment of a method for controlling rollback in a CVT. As depicted in FIG. 3A, if an initial rotation of first carrier 114 causes a first skew angle 310a to cause a first tilt angle rate of change 340a to a first tilt angle 340b, then after the initial rotation to a first skew angle 310b, while axle ends 111A move radially inward, first carrier 114 may be rotated in an opposite direction according to a second skew angle rate of change 310c to a second skew angle 310d to compensate for the effect that angled slots 116 have on the skew of planet axes of rotation 115, and skew angle rate of change 310e is held constant for a desired time or until tilt angle γ (gamma) achieves a target value 340d. Note that although skew angle rate of change 310e is constant, tilt angle 340c might change. In other words, a rotation angle for first carrier 114 does not equal the target tilt angle. When the desired movement has been made or the tilt angle γ (gamma) nears a target tilt angle 340e, an additional rotation 310g of first carrier 114 in the clockwise direction is required to return planet axes of rotation 115 to zero skew 310h in the rolling direction.

As depicted in FIG. 3B, if an initial rotation 310a of first carrier 114 adjusts CVP at a first tilt angle rate of change 340a to a first tilt angle 340b, then after the initial rotation to a first skew angle 310b, while axle ends 111A move radially inward, first carrier 114 may be rotated in an opposite direction according to a second skew angle rate of change 310c to a second skew angle 310d to compensate for the effect that angled slots 116 have on the skew of the planet axes of rotation 115. Skew angle rate of change 310 may be adjusted using a series 310e-1 to 310e-n or until tilt angle γ (gamma) achieves target value 340d (or nears target value 340d). When the desired movement has been made or when the CVT is operated in a design direction, an additional rotation 310g of first carrier 114 in the first direction may return planet axes 115 to zero skew 310h in the rolling direction. Tilt angle 340 remains at the target tilt angle until another set of commands.

A CVT that is started in a forward direction, started from stop, or started in a reverse direction may be controlled using an active control algorithm. The control logic for a skew control based planetary CVT with mechanical gamma feedback and which allows reverse rotation might include determining a current transmission ratio, such as by a stored value from another operation or the previous measurement, determining a current skew such as from the last observed rotation change and rotation values, (speed and direction), or determining the current direction of rotation and speed of rotation. If the rotation direction is reversed, or zero, or expected to be reverse, the relative carrier angle may be rotated to a position such that the sum of the last known skew and the rotation amount result in a skew value that would safely initiate a downward rotation in reverse rotation. As long as the CVT is operating in a reverse direction, control may include determining an actual skew direction and rate of change of the tilt angle gamma as well as rotation direction, and correcting the skew for selected conditions.

Figure 4:
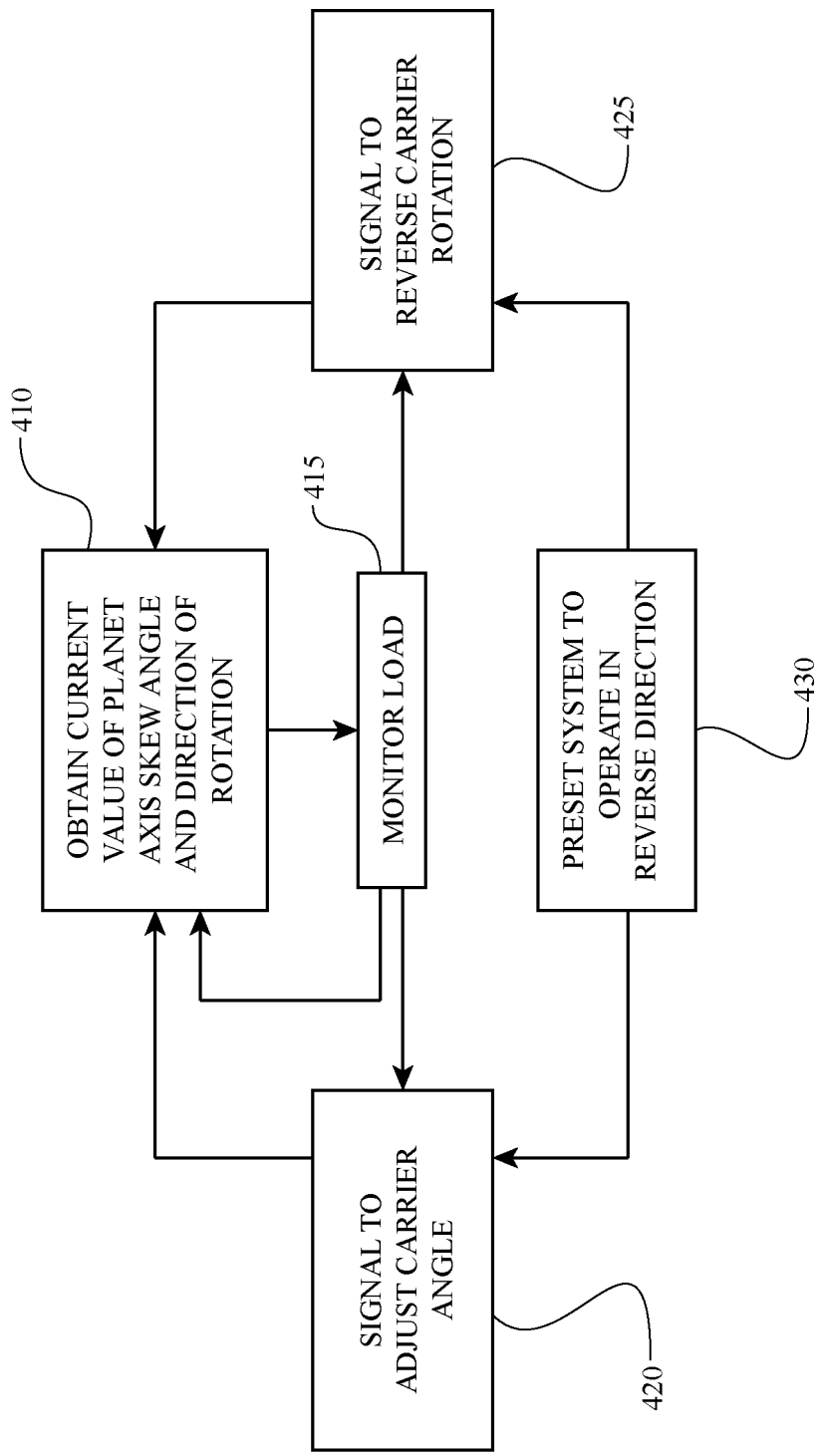
FIG. 4 depicts a flow chart illustrating one method for controlling rollback in a continuously variable transmission according to one embodiment.

FIG. 4 depicts a flow diagram, illustrating one method for controlling tilt angle of a CVT. As depicted in FIG. 4, the current value of planet axis skew angle and direction of rotation are obtained, the load is monitored, and as the ratio changes in the desired direction, subsequent signals may be communicated to maintain, reduce or reverse the skew angle an appropriate amount to control the rate of ratio change. Furthermore, embodiments may be preset to operate in a reverse direction as a precaution.

In step 410, a processor may receive, sense, or otherwise obtain information about a current value of planet axis skew angle and a direction of rotation. Planet axis skew angle may be known by determining a rate of change of planet axis skew angle and a rate of rotation of planets 110. A rate of change of the planet axis skew angle may be determined from a rate of change of a transmission ratio or other relative factors. Since the creep of the rolling surfaces, and subsequent loss of rolling speed, is related to the torque and speed of the transmission, calculation of the rate of change in planet axis angle is generally affected by the power. Hence, the power is one of the relative factors. Rotation direction can be determined by measurement of the phase angle between two offset signals such as inductive or Hall Effect speed pickups. Rotation direction can also be indicated by observing the direction of the actual change in transmission ratio versus an expected change. For example, if a signal is input to rotate the first carrier relative the second carrier to increase the ratio, but it decreases instead, that may be an indication that the rotation direction is the opposite of the expected rotation direction.

In some embodiments, step 415 includes monitoring the load on the CVT. Noting that the torque on the transmission causes load at each element in the control path, then backlash and compliance in the control elements, as well as changes in the creep rate, might affect the conclusion. Take for example the case where a signal to decrease ratio towards overdrive is synchronized with an increase in external load/torque on the transmission. A rotation of the relative angles of the carriers and subsequent desired change in skew angle of the planet axis might be expected to rotate the transmission towards overdrive. However, the increase in applied load might cause enough deflection in the elements to cause the actual skew angle to be opposite in sign. The result might be a negative rotation when a positive rotation was expected (or vice versa). Thus, the load on the transmission may be monitored and considered if rotation direction is to be determined from actual change in ratio versus expected change in ratio.

In step 420, a signal is sent to adjust carrier angle to provide a desired skew angle and therefore achieve a target tilt angle. Under forward operating conditions, steps 410, 415 and 420 are continuously performed to provide continuous and stepless transmission speed ratios.

Under reverse operations, steps 410, 415, 420 and 425 are continuously performed to provide continuous and stepless transmission speed ratios. In particular, any change of a planet axis 115 from a zero skew angle when the drive direction is opposite of design may likely cause a runaway move (i.e., an end 111A or 111B of one or more planet axles 111 will tend to translate along slot 116 or 126 towards one of the ratio extremes because of positive ratio feedback). In step 425, a signal to reverse carrier rotation is sent to an actuator. If carriers 114 or 124 are rotated such that reversed rotation is certain to move planet axes 115 towards underdrive, then as planets 110 move towards underdrive, one or both carriers 114, 124 may be rotated to an overdrive condition to compensate for the positive reinforcement of the underdrive rotation caused by slots 116 in carrier 114 or 124.

A CVT may be started from stop. Whenever the transmission is stopped, or the next action is indeterminate, a command for offsetting skew in the direction that will result in a rotation towards reduction if rotation direction is reverse may be communicated to an actuator. In a preferred embodiment, a command for offsetting the skew in the direction that will result in a rotation towards reduction if rotation direction is reverse that is adequate to overcome any inaccuracies in skew position due to machining error or droop in skew position due to load is communicated to an actuator. If the CVT is started from stop and the CVT is set to operate in a forward rotation direction but instead operates in a reverse rotation direction, damage may occur. In some embodiments, in step 430, the CVT is preset to operate in a reverse rotation direction. Thereafter, if the CVT is operated in a reverse mode, a command may be given to adjust the carrier angle (step 420) and embodiments may immediately begin monitoring the CVT to obtain information about the current value of planet axis skew and direction of rotation (step 410) to provide feedback to maintain a stable system. Alternatively, if the CVT is operated in a forward direction, slots 116 or other geometry of carriers 114 and 124 immediately provide positive feedback to maintain a stable system. Advantageously, the potential for damage to the system is reduced.

In some embodiments, a signal (e.g., a signal as sent in steps 420 or 425 or information obtained by monitoring a load in step 415) may be sent to an actuator to maintain the present skew angle of a CVT. The actuator may maintain this skew angle until subsequent signals are communicated to the actuator. Rotating may be accomplished by a processor sending a signal to an actuator coupled to carrier 114 or 124.

In some embodiments, an actuator may be coupled to both carriers 114 and 124, and changing the skew angle may involve coordinating the rotational position of carriers 114 and 124.

The rate at which negative feedback is provided by an actuator may be more than the rate at which feedback is provided by the slots in forward operation. For example, the feedback provided by the slots depends on, among other things, the widths of the slots. As such, wider slots may provide less feedback. In other embodiments, the amount of negative feedback may be based on a parameter of the slots along with a speed of the CVP, a speed ratio (SR) of the CVP, a tilt angle of the CVP, or some other parameter determined to have an effect on the likelihood of the CVP adjusting to an undesired operating condition. Thus, if a CVP is operating at a high speed and slots 116, 126 have greater tolerances, more feedback (including higher frequency or greater magnitude) may be required to prevent damage, but a CVP operating at low speeds or with tighter tolerances may require less feedback.

As disclosed above, a system utilizing an active control algorithm may be useful for stabilizing a CVT in either rotation direction. In addition to controlling rollback by using continuous adjustments after an initial rotation, embodiments may include systems for controlling conditions which could lead to rollback. In some embodiments, a third plate with a third set of slots may be used as a timing plate. A timing plate may partially synchronize the ratio angles and the skew angles of each planet 110 within the plurality of planets 110.

Figure 5C:
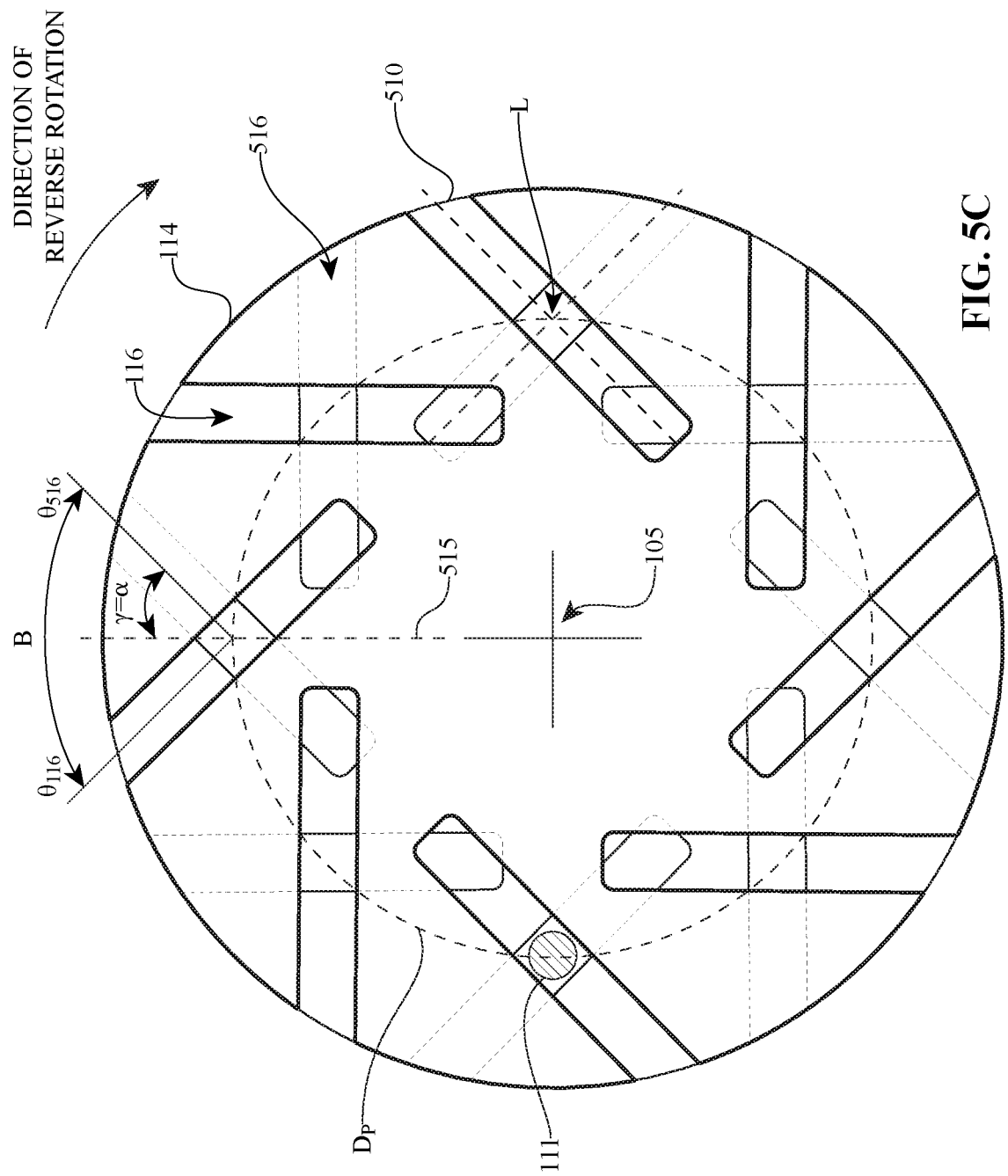
FIGS. 5C and 5D depict views of one embodiment of a system including carrier plates with control via a floating timing plate interposed between the carrier plates.

FIGS. 5A, 5B and 5C depict views of carriers 114 and timing plate 510. It should be noted that carrier 124 is not shown, but that carrier 114 and carrier 124 are similar and may be identical. Accordingly, only carrier 114 is described here for simplicity and ease of understanding. Also, it should be noted that carrier 114 and timing plate 510 are depicted in FIGS. 5A and 5B as mirror images. However, this is just for ease of description and the dimensions of timing plate 510 may differ. For example, a thickness of timing plate 510 may be less than a thickness for carrier 114, the value of an angle for slot 516 may be more than, less than, or the same as the value of an angle for slot 116, the width ($W_{516}$) of slot 516 may be greater than, the same, or less than the width ($W_{116}$) of slot 116, the length ($L_{516}$) of slot 516 may be longer or shorter than the length ($L_{116}$) of slot 116, etc. In some embodiments, width $W_{516}$ of slot 516 has tolerances selected such that slots 116 or 126 are the primary structures for controlling planet axle ends 111A or 111B in forward and reverse operations and slots 516 are for preventing runaway or other effects in reverse operation. In some embodiments, the value of an angle, the width, or some other parameter of slot 516 is selected such that slots 116 or 126 are the primary structures for controlling planet axle ends 111A or 111B in forward operations, and slots 516 are intended for preventing runaway or other effects in reverse operation.

Figure 5D:
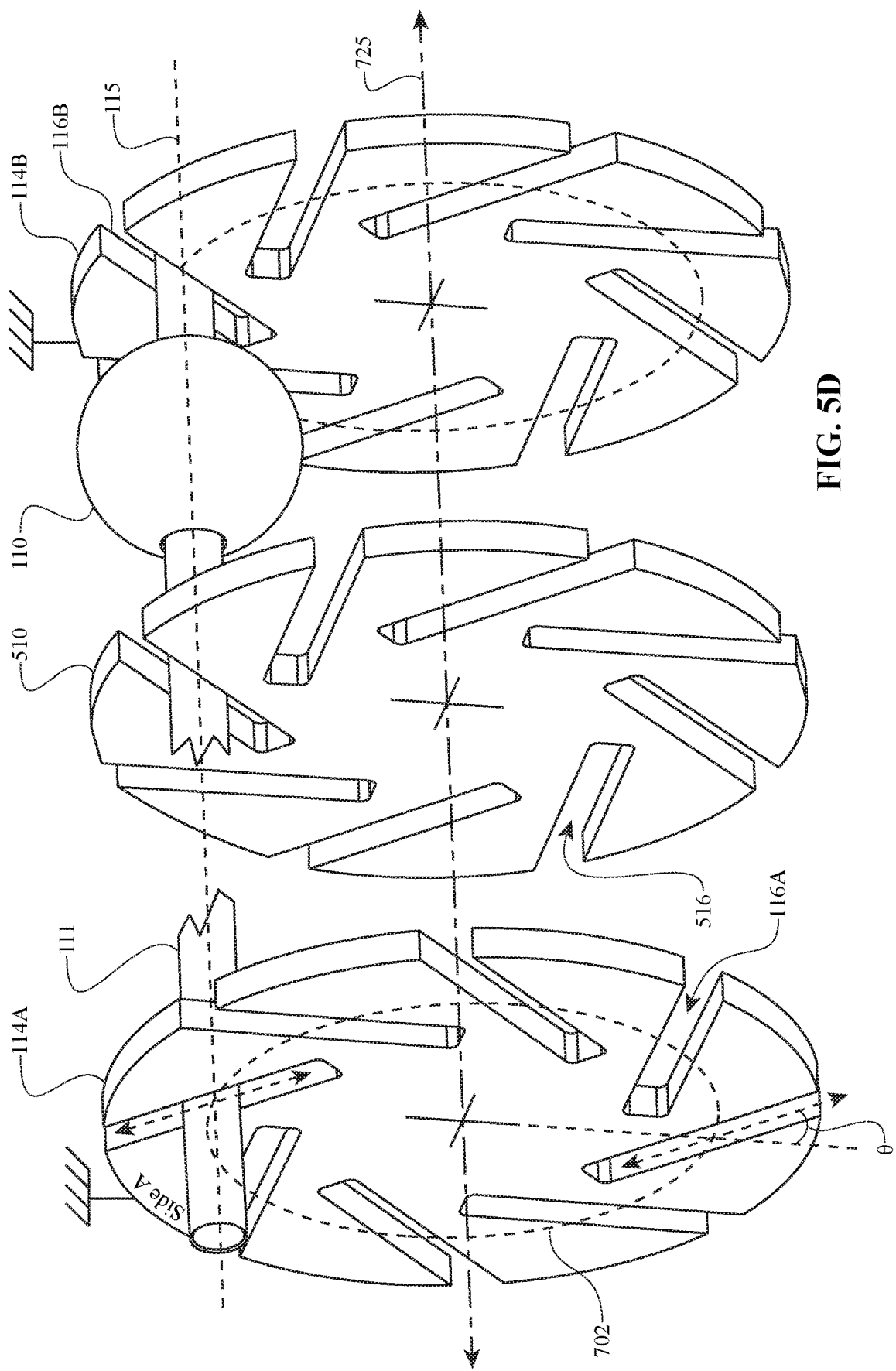

FIGS. 5C and 5D depict views of one embodiment of a system including carrier plates 114A and 114B with control via a floating timing plate 510 interposed between carrier plates 114A and 114B. As depicted in FIGS. 5C and 5D, planet axles 111 extend through timing plate slots 516 and engaging carrier slots (e.g., carrier slots 116A and 116B). If an angle (B) between timing plate slot 516 and corresponding carrier slot 116 is other than zero, then one end (111A or 111B) of planet axle 111 may be positioned at the intersection (L) of timing plate slot 516 and carrier slot 116. In this configuration, timing plate 510 may be useful for controlling the movement of planet axles 111 along carrier slots 116, such as preventing any single planet axle 111 from deviating in a direction from the other planet axles 111, or maintaining each planet axle 111 at an angle within a tolerance of a collective angle for the plurality of planet axles 111. For example, if the collective angle is 25 degrees, embodiments may ensure all axles are at an angle between 22 degrees and 28 degrees. It is advantageous for efficient forward operation that slots 516 in each of carriers 114, 124 synchronize the angular spacing among the ends of each planets planet axle 111 within the array of planets 110. Embodiments disclosed herein provide an adequate amount of clearance or backlash in the timing plate slots to prevent timing plate 510 from interfering with the operation of either of the carriers (114 or 124).

The driving angle (alpha) refers to the angle between the projection of each of the timing plate slots 516 and a line 515 radial to the center axis and intersecting the centers of the timing plate slots 516 at the pitch diameter of the array of planets wherein the projection plane is normal to center axis 105. Blocking angle (B), as used herein, may refer to the angle between the projection of the timing plate slot centerlines and the carrier slot centers at the intersection of the timing plate slot centerlines, the carrier guide slot centerlines and the pitch diameter of the array of planets wherein the projection plane is normal to the center axis. The optimal blocking angle occurs when timing plate slots 516 are 90° to carrier slots 116 and 126 (opposite the direction of rotation).

Timing plate 510 may be free running or may be grounded relative to a carrier (e.g., carrier 114 or 124). In embodiments in which timing plate 510 is free running, its angular position may be determined by the sum of forces of the array of planet axles 111. In a preferred embodiment, the driving angle for slots 516 in timing plate 510 ideally will be less than 90° from radial. Advantageously, timing plate 510 may prevent a large error in ratio or skew by blocking the change of ratio angle. In a preferred embodiment, from the dual considerations for blocking and driving, timing plate slots 516 are configured such that the blocking angle is no less than 30° (relative to a radial line and in the design direction of rotation) and the driving angle no greater than 45° (relative to a radial line and opposite the design direction of rotation).

In some embodiments, timing plate 510 having radial slots 516 may enhance the control by ensuring each planet 110 in the array of planets 110 is within a controlled ratio angle of the set of planets and within a limited skew angle of the set of planets 110. Timing plate 510 may be a free turning disc with radial slots 516. In some embodiments, timing plate 510 may be positioned axially between the carrier halves 114 and 124. Each of the planet axles 111 passes through timing plate 510 before engaging the carrier guide slots 116 or 126 at one end of the drive. Tolerances of timing plate slots 516 allow carrier slots 116 or 126 to be the primary control of axles 111 and the primary circumferential alignment feature for planets 110. In some embodiments, the tolerances allow deviations of up to 3 degrees. In other embodiments, the tolerances allow for deviations up to 5 degrees.

In some embodiments, timing plate 510 having offset radial slots 516 may enhance the control by ensuring each planet axle 111 for all planet axles 111 in the array of planets 110 is within a controlled ratio angle of a mean ratio angle of the plurality of planets and within a limited skew angle of a mean ratio angle of the plurality of planets.

In some embodiments, timing plate 510 may comprise a disc with offset radial slots 516 formed therein, and may be positioned axially outside of one of carriers 114 or 124 and driven by carrier 114 or 124 opposite its axial position relative to planets 110. Each of the planet axles 111 extends through a carrier guide slot 116 or 126 and engages a timing plate slot 516. In this configuration, timing plate slots 516 has larger tolerances. However, carrier guide slots 116 or 126 have sufficient tolerances for planet axles 111 to allow timing plate slots 516 to be the primary circumferential alignment feature for planets 110. The angle of timing plate slots 516 may be determined as a function of the angles of carrier guide slots 116 and 126 in both carriers 114 and 124.

There are considerations which may affect the choice of the offset radial slot angles for a free running timing plate 510. These considerations include, but are not limited to, minimizing the timing plate drive torque, maximizing the synchronizing force, and minimizing the backlash or allowed synchronization error. Some factors which may affect these considerations include: manufacturing variations and tolerance bands for carrier guide slot radial spacing; carrier guide slot width; timing plate guide slot radial spacing; timing plate guide slot width; and axle or axle endcap diameters. Control factors such as a desired stationary skew value or a minimum desired continuous skew in reverse operation may also be of interest in timing plate offset radial angle design.

In some configurations, it may be necessary or desirable to have a timing plate driven by a carrier positioned proximate to the timing plate (i.e., located axially on the same side of a plurality of planets). In these configurations, the timing plate and the driving plate may be coupled via a mechanism such that an angular movement of the driving plate in a first direction is counteracted by an angular movement of the timing plate in the opposite direction. In some embodiments, a timing plate may have a first gear with a first set of teeth, and a carrier may have a second gear with a second set of teeth for meshing with the first set of teeth. As the carrier rotates, the second gear rotates in a first direction while the second set of teeth are engaged with the first set of teeth on the first gear, which causes the first gear to rotate in an opposite direction to bias the timing plate. Other mechanisms may be possible.

A method of manufacturing a timing plate for controlling rollback in a CVT capable of reverse operation may include forming a plurality of timing plate slots (e.g., slots 516) in a timing plate, wherein the plurality of timing plate slots are formed at an angle relative to a plurality of carrier guide slots (e.g., slots 116 or 126). The angle may be determined based on an analysis for optimizing a synchronization force (i.e., the force necessary to prevent one or more runaway planets from affecting the array of planets). In some embodiments, forming the plurality of timing plate slots includes determining an angle (b) between the timing plate slots and a radial line, wherein both intersect at the planet array pitch radius at an angle of 0° (i.e., perpendicular to a planet axis). The angle may be determined based on an analysis of criteria to minimize a skew or tilt force (i.e., a force necessary to effect a desired skew angle or tilt angle). In some embodiments, the method may further include determining an angle between the timing plate slots and a radial line of between 30° and 60°, where both intersect at the planet array pitch radius. The angle may be determined based on a compromise between any of the preceding factors. Furthermore, in some embodiments, the angle between the timing plate slots and a radial line where both intersect at the planet array pitch radius of between 0° and 80° is protected for the maximum possible contributions of all the previously described factors.

In some embodiments, a targeted continuous operating condition for rotation opposite design comprises a position such that the planet axles or planet axle endcaps nearest the input end of the CVP contact the centermost limit of the input carrier's guide slot. In some embodiments, a skew angle may be limited to a minimum angle required to maintain a reduction rotation effort for each of the planets in the array of planets. A minimum skew angle may be determined based on machining tolerances (including errors or other variations) and may further account for changes in external load or ratio droop.

In some embodiments, all but one of the array of planets may be held with a small amount of positive skew, which may allow the system to gradually change ratio in an overdrive direction. The remaining planet may be held at a position with a small amount of negative skew. However, the planet with negative skew is prevented from having additional negative skew or from negating the positive skew of the remaining planets.

Embodiments disclosed herein have been described as they pertain to planetary type continuously variable transmissions. Furthermore, embodiments have been depicted with power entering through a shaft. However, those skilled in the art will appreciate that concepts and features described herein may be applicable to other settings, including power entering through a ring or some combination of rings and a shaft. Furthermore, embodiments disclosed herein may be used individually or in combination with other embodiments to provide a drive train, continuously variable transmission, variator or the like capable of operating in either a forward direction or a reverse direction. Those skilled in the art will appreciate that these concepts may be equally useful in other settings and are thus not to be limited.

What is claimed is:

1. A method for controlling rollback in a continuously variable transmission (CVT) by a control system comprising a controller communicatively coupled to a sensor configured to sense a first operating parameter of the CVT, the control system further comprising an actuator configured to change a second operating parameter of the CVT, the method comprising:
  sensing the first operating parameter of the CVT; and
  sending a command to the actuator to adjust a speed ratio of the CVT based on the sensed first operating parameter and a direction of rotation of the CVT, wherein if the CVT changes direction of rotation, sending a command to the actuator comprises:
    sending a first command to the actuator to cause a first adjustment of the CVT;
    sensing a rate of change of the first operating parameter based on the first adjustment; and
    sending a second command to the actuator to cause a second adjustment of the CVT to maintain the rate of change of the first operating parameter constant, wherein the second command is sent based on the sensed first operating parameter.

2. The method of claim 1, wherein the first operating parameter comprises a speed ratio and the second operating parameter comprises a tilt angle or a skew angle.

3. The method of claim 1, wherein the first operating parameter comprises a tilt angle and the second operating parameter comprises the tilt angle or a skew angle.

4. The method of claim 1, wherein sensing the rate of change of the first operating parameter based on the first adjustment is performed when the CVT is rotating in a reverse direction of rotation.

5. A system for controlling rollback in a continuously variable transmission (CVT), comprising:
- a controller communicatively coupled to a sensor configured to sense a first operating parameter of the CVT; and
- an actuator configured to change a second operating parameter of the CVT, wherein the controller comprises a set of instructions configured to:
  - send a first command to the actuator to cause a first adjustment of the CVT;
  - sense a rate of change of the first operating parameter based on the first adjustment; and
  - send a second command to the actuator to cause a second adjustment of the CVT to maintain the rate of change of the first operating parameter constant wherein the second command is sent based on the sensed first operating parameter.

6. The system of claim 5, wherein the first operating parameter comprises a speed ratio and the second operating parameter comprises a tilt angle or a skew angle.

7. The system of claim 5, wherein the first operating parameter comprises a tilt angle and the second operating parameter comprises the tilt angle or a skew angle.

8. The system of claim 5, wherein sensing the rate of change of the first operating parameter based on the first adjustment is performed when the CVT is rotating in a reverse direction of rotation.

\* \* \* \* \*